US012617194B2

(12) United States Patent
Roumanie et al.

(10) Patent No.: US 12,617,194 B2
(45) Date of Patent: May 5, 2026

(54) METHOD OF MANUFACTURING A MULTILAYER STRUCTURE

(71) Applicants:COMMISSARIAT À L'ENERGIE ATOMIQUE ET AUX ENERGIES ALTERNATIVES, Paris (FR); SOITEC, Bernin (FR)

(72) Inventors: Marilyne Roumanie, Grenoble (FR); Christelle Navone, Grenoble (FR); Sébastien Quenard, Grenoble (FR); Didier Landru, Bernin (FR); Christelle Veytizou, Bernin (FR)

(73) Assignees: COMMISSARIAT A L'ENERGIE ATOMIQUE ET AUX ENERGIES ALTERNATIVES, Paris (FR); SOITEC, Bernin (FR)

( * ) Notice: Subject to any disclaimer, the term of this patent is extended or adjusted under 35 U.S.C. 154(b) by 254 days.

(21) Appl. No.: 18/287,148

(22) PCT Filed: Apr. 12, 2022

(86) PCT No.: PCT/FR2022/050691
§ 371 (c)(1),
(2) Date: Oct. 16, 2023

(87) PCT Pub. No.: WO2022/219283
PCT Pub. Date: Oct. 20, 2022

(65) Prior Publication Data
US 2024/0190120 A1    Jun. 13, 2024

(30) Foreign Application Priority Data

Apr. 16, 2021    (FR) ...................................... 21/03986

(51) Int. Cl.
B32B 37/12        (2006.01)
B32B 7/12         (2006.01)
(Continued)

(52) U.S. Cl.
CPC ............ B32B 37/1284 (2013.01); B32B 7/12 (2013.01); B32B 37/06 (2013.01); B32B 37/10 (2013.01);
(Continued)

(58) Field of Classification Search
CPC ........... H01L 21/7624; H01L 21/76251; H01L 21/76; H01L 21/254; H01L 21/76254;
(Continued)

(56) References Cited

U.S. PATENT DOCUMENTS 6,528,145 B1    3/2003  Berger et al.
2002/0146893 A1    10/2002  Shimoda et al.
(Continued)

FOREIGN PATENT DOCUMENTS

FR    3 102 608 A1    4/2021
JP    2017-034255 A    2/2017
(Continued)

OTHER PUBLICATIONS

Aug. 1, 2022 International Search Report issued in International Patent Application No. PCT/FR2022/050691.
(Continued)

*Primary Examiner* — Carson Gross
(74) *Attorney, Agent, or Firm* — Oliff PLC

(57)        ABSTRACT

A method for producing a multilayer structure includes the following steps: a) providing a first substrate, b) depositing a thick layer of a precursor formulation including a preceramic polymer filled with inorganic particles on the first substrate, c) providing a second substrate, d) adhesively bonding the thick layer and the second substrate, e) thinning the first substrate or the second substrate so as to obtain an active layer, f) applying a pyrolysis heat treatment so as to ceramize the preceramic polymer of the thick layer and to obtain a ceramic matrix composite material, the filler con-
(Continued)

tent and the nature of the inorganic particles being chosen so that the thick layer has a coefficient of thermal expansion which differs, at most, by 15% from that of the first substrate and from that of the second substrate.

12 Claims, 5 Drawing Sheets

(51) Int. Cl.

| | | |
|---|---|---|
| *B32B 37/06* | (2006.01) | |
| *B32B 37/10* | (2006.01) | |
| *B32B 37/24* | (2006.01) | |
| *B32B 38/00* | (2006.01) | |
| *B32B 38/10* | (2006.01) | |

(52) U.S. Cl.
CPC .......... *B32B 38/0036* (2013.01); *B32B 38/10* (2013.01); *B32B 2037/243* (2013.01); *B32B 2307/7376* (2023.05); *B32B 2315/02* (2013.01)

(58) Field of Classification Search
CPC .. B32B 38/10; B32B 2315/02; B32B 2457/14
See application file for complete search history.

(56) References Cited

U.S. PATENT DOCUMENTS

| | | |
|---|---|---|
| 2011/0073236 A1 | 3/2011 | Lee |
| 2015/0171045 A1 | 6/2015 | Berger et al. |
| 2017/0033011 A1 | 2/2017 | Rupp et al. |

FOREIGN PATENT DOCUMENTS

| | | |
|---|---|---|
| KR | 10-1999-0067067 A | 8/1999 |
| KR | 10-2002-0002216 A | 1/2002 |

OTHER PUBLICATIONS

Aug. 1, 2022 Written Opinion of the International Searching Authority issued in International Patent Application No. PCT/FR2022/050691.

[Fig. 1]
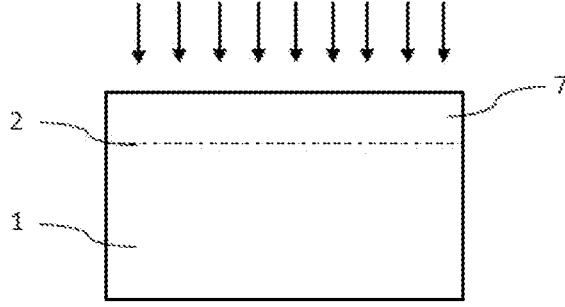
[Fig. 2]
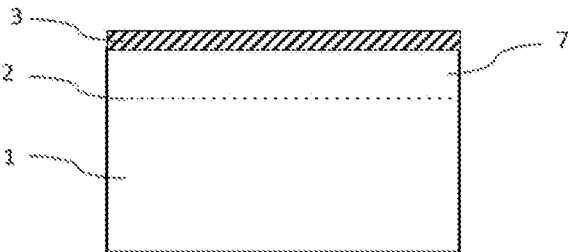
[Fig. 3]
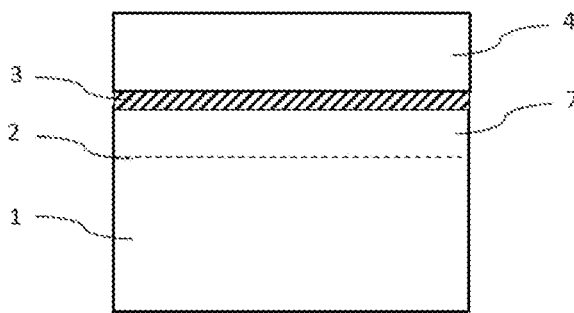

[Fig. 4]
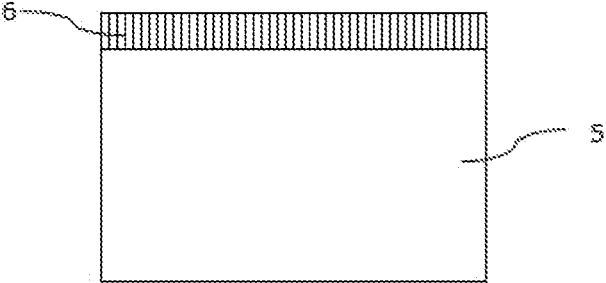
[Fig. 5]
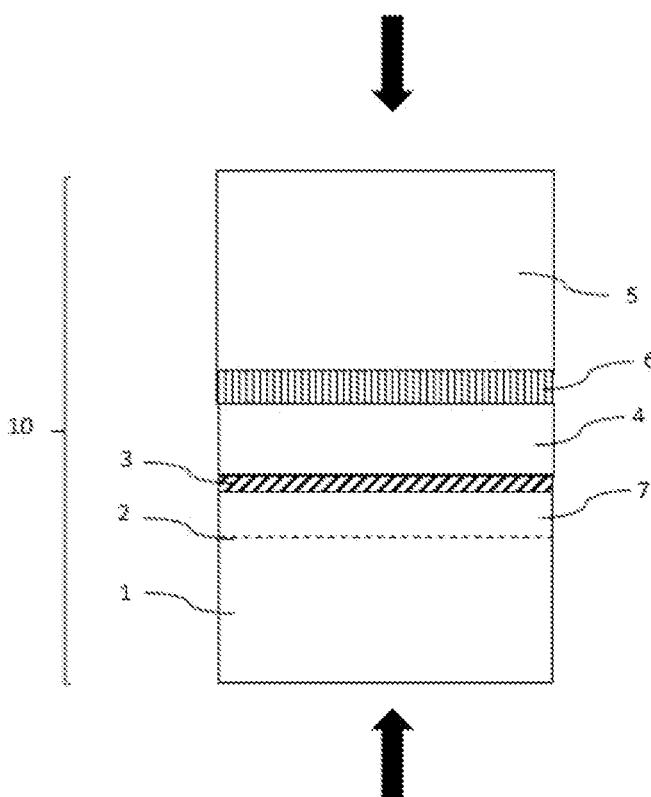

[Fig. 6]
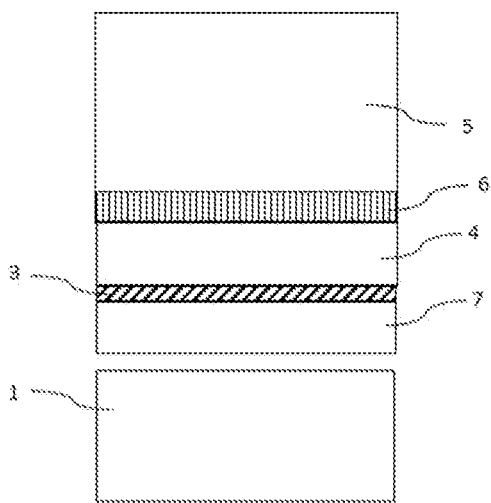
[Fig. 7]
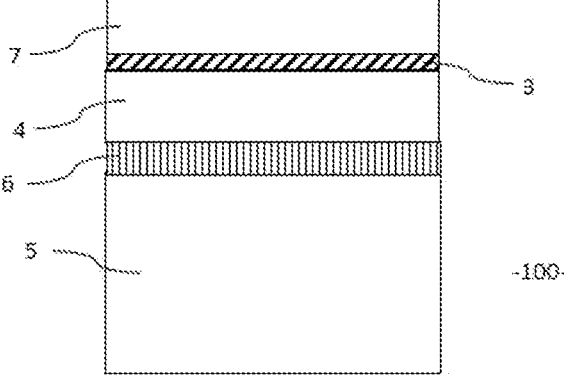

[Fig. 8]
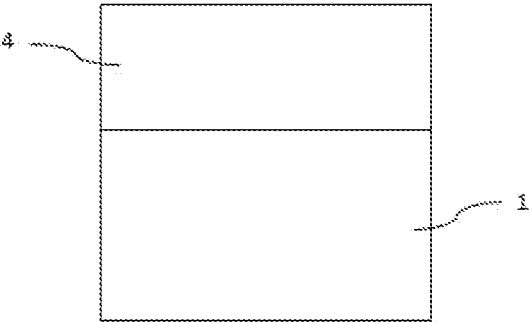
[Fig. 9]
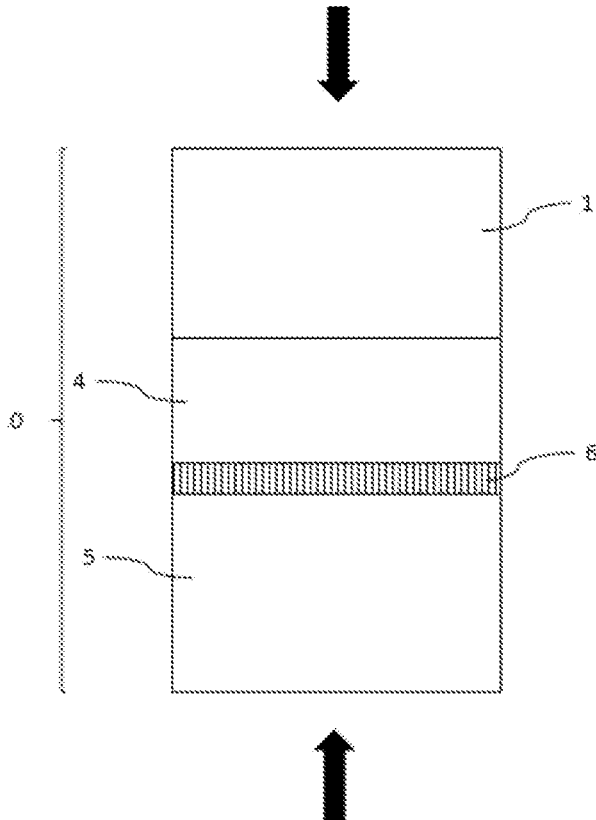

[Fig. 10]
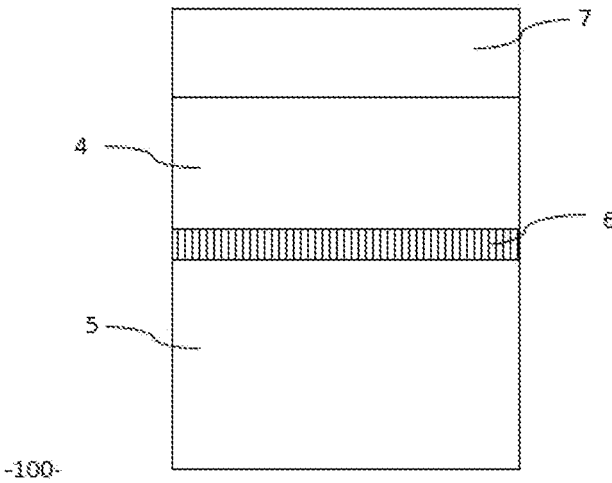

METHOD OF MANUFACTURING A MULTILAYER STRUCTURE

The present invention relates to the field of producing advanced substrates for applications in electronics (for example for MEMS) in microelectronics, in optoelectronics (for example for LEDs), in power electronics, in RF, for packaging and transfer handles. In particular, the invention relates to a method for producing a multilayer structure, withstanding high temperatures, and in particular a structure of the SeOI type (standing for Semiconductor On Insulator) proposing a semiconductor layer separated from a support substrate by a thick layer with modular properties, for example for the integration of RF components. According to another aspect, the invention also relates to a multilayer structure obtained by said producing method.

The current trend tends towards an increasingly dense integration of components and miniaturization of devices, which increases the need for substrates that feature improved performances, including in particular a very good heat dissipation capacity, as well as excellent resistance to temperature variations. The manufacture of increasingly more complex structures requires annealing at temperatures that could reach 1,000° C., not to mention that the operating temperature could reach 800° C., in particular with regards to RF applications. The different materials necessary to create these multilayer structures are at the origin of different expansions within the structure. This generates stresses that could lead to the apparition of defects, cracks within the layers or the delamination of the layers. These constraints exclude the use of traditional polymers, withstanding a maximum temperature of 400° C., to obtain bonding between the layers.

One of the aims of the present invention is to provide a method for producing a multilayer structure which overcomes at least one of the abovementioned obstacles. To this end, the present invention provides a method for producing a multilayer structure intended for applications in the field of microelectronics, the method comprising the following steps:

a) providing a first substrate, b) depositing a thick layer of a precursor formulation comprising a preceramic polymer charged with inorganic particles over the first substrate, c) providing a second substrate, d) bonding the thick layer and the second substrate, e) thinning the first substrate or the second substrate so as to obtain an active layer, intended in particular to receive electronic devices, f) applying a pyrolysis heat treatment so as to ceramize the preceramic polymer of the thick layer and obtain a ceramic matrix composite material, the charge rate and the nature of the inorganic particles being selected so that the thick layer has a coefficient of thermal expansion which differs at most by 15% from that of the first substrate and that of the second substrate between the room temperature and the pyrolysis temperature, advantageously which differs at most by 10% from that of the first substrate and that of the second substrate and for example which differs at most by 5% from that of the first substrate and that of the second substrate.

Thus, the production method according to the invention allows obtaining a multilayer structure wherein the properties of the thick layer and in particular the coefficient of thermal expansion (also known by the acronym CTE standing for Coefficient of Thermal Expansion) can be modulated so as to be compatible with the CTEs of the first substrate and of the second substrate. Advantageously, the structure may be used in processes or applications involving considerable thermal changes.

The existence of a large choice of preceramic polymer and inorganic particles ensures the possibility of selecting the polymer suited to the targeted multilayer structure, through its properties and its compatibility with the substrate over which it is deposited. In this case, the preceramic polymer and the inorganic particles are selected so that once cross-linked and pyrolyzed, the resulting composite material has a coefficient of thermal expansion close to that of the first and/or second support. Thus, the materials constituting the multilayer structure expand and contract in a similar way during temperature changes, which avoids stresses in the structure that might damage the layers by the apparition of cracks, defects, or delamination of the layers. Depending on the inorganic particles used, the thick layer may be electrically insulating while having a high heat dissipation capacity. This is particularly advantageous for regulating the temperature of the structure, in particular when used in applications comprising transistor-type components, the operating temperature of which could reach 800° C. Thus, the thick layer according to the invention allows for a great modularity.

In addition, the preceramic polymer has the advantage of having an excellent temperature resistance. Indeed, a preceramic polymer is an organic/inorganic polymer that is generally used in order to make so-called PDC ceramic objects (an acronym standing for "Polymer Derived Ceramics") after heat treatment at high temperature.

This enables the structure to undergo heat treatments at high temperatures, in particular when fixing defects generated by implantation of ionic species for thinning of a substrate, for example. Thus, this method guarantees the stability of the assembly of the multilayer structure throughout the process of production thereof, in particular despite a step of pyrolysis of the preceramic polymer, and also withstanding a high operating temperature (related to the electronic components of the active layer).

The composite material thus obtained has a mechanical strength that is sufficient for the desired applications. Indeed, the preceramic polymer is a binder for inorganic particles. After ceramization by pyrolysis, in particular around 1,000° C., it leads to the formation of a ceramic matrix in which the inorganic particles are coated. The obtained PDC ceramic matrix is essentially amorphous, and even completely amorphous, and forms a binder to the inorganic particles distributed homogeneously in the matrix without coalescence with each other. Pyrolysis also allows compacting the thick layer. Also, the pre-sintering or sintering of the ceramic which is done at a temperature higher than that of pyrolysis is not necessary for the targeted applications, which advantageously limits the manufacturing costs. Thus, the production method allows achieving in a simple and reliable manner a multilayer structure that is stable at high temperatures and whose properties could be easily modulated for the targeted applications.

By the expression 'active layer', it should be understood a layer made of a semiconductor material in which the electrical events take place.

By the term 'ceramize' or 'ceramization', and other derivatives, it should be understood in the present document, the transformation of the preceramic polymer by pyrolysis into a non-sintered ceramic.

Advantageously, the precursor formulation of the thick layer deposited in step a) comprises a charge rate of inorganic particles in a range from 50% to 80% by volume with respect to the volume of the preceramic polymer. This charge rate allows conferring the desired properties on the thick layer, in particular in terms of coefficient of thermal expansion. This also allows limiting dimensional losses of the preceramic polymer during ceramization. Indeed, the use of preceramic polymers induces a considerable dimensional change during pyrolysis enabling the conversion of the polymer into ceramic. This generates residual mechanical stresses leading to the formation of defects, cracks and sometimes the collapse of the layer when the preceramic polymer is shaped. Thus, the presence of fillers allows limiting volume loss.

Moreover, the charge rates remain low enough to guarantee the presence of a sufficient amount of preceramic polymer in the layer. The material preserves its role of inorganic particles binder, before and after ceramization.

According to one arrangement, the inorganic particles are selected from among $Si_3N_4$, SiC, AlN, $Al_2O_3$ and a mixture of these inorganic particles. These particles, considered as such or in a mixture, are used to confer on the preceramic polymer and the ceramic matrix a CTE close to that of the semiconductor materials that could be used in the multilayer structure.

The size of the used particles varies from a few nanometers to one hundred micrometers; it is primarily selected with regards to the thickness of the desired layer. For an adhesion primer layer, a size smaller than 1 micrometer will be preferred whereas it will be possible to use the entirety of the aforementioned range for a thick layer of several hundred micrometers.

In concrete terms, the method comprises, before the bonding step d), a step of rectifying the thick layer, so as to smooth the surface and reach the desired layer thickness. Typically, the thickness of the thick layer is comprised between 10 and 500 micrometers.

According to one possibility, the thick layer loses between 20% and 50% of its initial thickness during ceramization. The thickness of the ceramized thick layer is comprised between about 5 and 400 micrometers after step f) starting from a thick layer with a thickness comprised between 10 and 500 micrometers before ceramization.

According to one arrangement, the preceramic polymer of the precursor formulation is selected from among polysiloxanes, polycarbosilanes, polysilazanes, polyborosilanes, polysilsesquioxanes, polysilylcarbodlimides, polysilsesquicarbodiimides, polsilsesquiazane, polyborosiloxanes, polyborosilazanes and a combination of these polymers. The selection of the nature of the preceramic polymer depends on the properties targeted for the desired multilayer structure but also on its compatibility with the substrate over which it is deposited.

Preceramic polymers derived from polysiloxanes, polycarbosilanes, and polysilazanes may contain metals such as Hf, Zr, Ti, Al.

The targeted ceramic matrices are among SiOxCy, where x is less than 2 and y is different from zero, SiCN, Si(M)OC, Si(M)C, Si(M)CN, and SiBCN.

According to one possibility, step b) of depositing the thick layer is carried out by coating or screen-printing when the precursor formulation is liquid. A solvent may be added to the precursor formulation so as to obtain a liquid precursor formulation with the desired viscosity. It is selected from among xylene, MEK (standing for Methyl Ethyl Ketone or 2-butanone solvent available for example from Sigma Aldrich, Supelco . . . ) or Diestone DLS (a solvent composition supplied by the Socomore company.

According to another possibility, when the precursor formulation is solid, step b) of depositing the thick layer is carried out by hot-pressing.

Advantageously, when the first and second substrates are made of silicon, the used preceramic polymer is SILRES® MK POWDER and the inorganic particles are made of SiC, the whole leading to a ceramic with a CTE very close to that of silicon.

According to a particular embodiment of the method of the invention, the first substrate and the second substrate are made of silicon and the precursor formulation is prepared by mixing a preceramic polymer SILRES® MK POWDER in a proportion ranging from 2% to 4% by weight with inorganic SiC particles in a proportion ranging from 65 to 72% by weight and a solvent, such as the Diestone DLS solvent, in a proportion ranging from 24% to 33% by weight.

A mixture of inorganic particles may also be used instead of SiC, such as $Si_3N_4$ in a proportion of 75-85% mixed with $Al_2O_3$ in a proportion of 15-25%.

A mixture of $Si_3N_4$ in a proportion of 45-70% mixed with AlN in a proportion of 30-55% also allows obtaining a thick layer whose CTE differs by less than 10% from silicon.

Advantageously, the bonding of step d) between the thick layer and the second substrate is carried out via an adhesion primer layer, formed beforehand over the second substrate and/or over the thick layer. This layer allows improving the bonding energy between the thick layer and the material of the second substrate. This contributes to the mechanical strength of the multilayer structure when it is subjected to mechanical steps, such as rectification. The selection of the nature of the adhesion primer layer is done so as to confer resistance to the pyrolysis temperature and obtain good adhesion with the thick layer. Thus, it is selected from among preceramic polymers, existing in liquid or solid form, to which it is possible to add a solvent so as to modulate the viscosity and facilitate application thereof.

According to one possibility, the adhesion primer layer has a thickness comprised between 1 and 10 micrometers. This thickness is large enough to achieve its bonding role, and besides, it is prone to crack. Formed beforehand over the second substrate and/or over the thick layer, the precursor formulation comprises an adhesion preceramic polymer material, such as SILRES® H62C polysiloxane available from the Wacker company.

Advantageously, when the adhesion preceramic polymer is deposited over the second substrate, the latter is pre-crosslinked before coming into contact with the thick layer so as to allow good bonding. This step is carried out at a temperature lower than that of crosslinking of the considered polymer. This step consists of a step of stabilizing the preceramic polymer which allows reaching a state just before the thermoset state of the polymer. At this stage, the polymer is deformable but not solubilizable. Indeed, the pre-crosslinked adhesion preceramic polymer has some non-crosslinked functions which enable it to bind to the thick layer.

When the adhesion primer layer is deposited over the thick layer, the preceramic polymer of the thick layer is pre-crosslinked beforehand, for example by applying a heat treatment at a temperature lower than the crosslinking temperature of the preceramic polymer, typically between 50 and 400° C.

According to a variant wherein the adhesion preceramic polymer (of the adhesion primer layer) is in the form of a solid powder, for example SILRES® MK POWDER, it could be dispensed over the thick layer. Bonding will take place when the powder is melted.

Alternatively, the adhesion primer layer comprises a charge rate of up to 50% of the total volume of the adhesion preceramic formulation. This allows limiting the volume shrinkage upon crosslinking of the adhesion polymer and also functionalizing the adhesion primer layer according to the nature of the charge and the charge rate, such as providing electrical conductivity with Cu, Ag, Al or thermal conductivity with SiC, AlN, BN.

Advantageously, the step bonding d) comprises a step of bringing the thick layer and the second substrate into contact so as to form a stack and a step i) of hot-pressing said stack.

This step allows stabilizing bonding by increasing the bonding energy between the thick layer and the second substrate and the mechanical strength of the stack leading to the multilayer structure. In the present document, it should be understood that the contact could be carried out by direct contact of the thick layer with the second substrate or by indirect contact, obtained via an adhesion primer layer, as described hereinabove.

According to one possibility, the hot-pressing step i) comprises the application of a crosslinking heat treatment at a temperature varying between 100° C. to 400° C. and a pressure lower than 500 kPa so as to obtain crosslinking of the preceramic polymer of the thick layer. The use of pressure allows eliminating the need for complicate surface preparation steps before bonding, nonetheless, the higher the pressure, the more the surfaces have to be planarized and be free of dust to avoid breakage of the substrate. Moreover, the adhesion preceramic polymer is also crosslinked by this step where appropriate.

In the particular case of using a SILRES® MK POWDER preceramic polymer, the crosslinking heat treatment is applied by a heating ramp comprised between 0.1 and 20° C./min and preferably between 0.5° C./min and 5° C./min and for example 1° C./min.

According to one possibility, thinning according to step e) of the method is obtained by the Smart Cut™ technology. The method comprises, before step b), a step a1) of implanting ionic species in the first substrate so as to create a weakening plane, and the thinning step e) comprises a step of fracture along the weakening plan.

The fracture step may be obtained by applying a heat treatment followed, or not, by the application of a mechanical stress. Afterwards, a pyrolysis heat treatment is typically carried out as an continuation of the fracture treatment, in a neutral atmosphere, such as under argon, which reinforces the bonding interface. A heating ramp is judiciously applied according to the thicknesses of the layers, the coefficients of thermal expansion and the materials considered so as to avoid deformations in the structure.

The hot-pressing step i) can contribute to the fracture thermal budget according to step e) where appropriate.

According to one possibility, the method comprises after the implantation step a1), a step a2) of depositing a stiffening layer over the implanted face. Advantageously, the stiffening layer is deposited before step b) of depositing the thick layer.

Preferably, the stiffening layer is formed in $Si_3N_4$ by a low-temperature deposition technique, such as PECVD at 300° C. over a thickness comprised between 500 nm and 4 microns. The material of the stiffening layer is stable at the pyrolysis temperature, and has a CTE close to that of the substrates. In addition, the used deposition conditions preserve the implanted area so as not to generate a fracture at this stage of the method.

Alternatively, the method comprises, before step b) of depositing the thick layer, the deposition of a complementary adhesion primer layer of made of a preceramic polymer over the stiffening layer so as to improve the contact between the thick layer and the stiffening layer. This complementary adhesion primer layer also confers a complementary stiffening effect. The thickness of the stiffening layer may be reduced accordingly.

According to an alternative to step e) carried out by fracture, the method provides for thinning carried out by rectification, so as to obtain an active layer thickness ranging from 10 micrometers to 140 micrometers, advantageously from 20 to 120 micrometers, and for example from 90 micrometers to 110 micrometers.

Advantageously, step f) of the process comprises the application of a vacuum pyrolysis heat treatment in the presence of nitrogen or under an argon atmosphere. The pyrolysis is performed under a controlled atmosphere. For example, a pyrolysis in air, in the presence of oxygen, generates the undesirable formation of an oxide, often in the form of a powder. The temperature of the pyrolysis heat treatment is lower than the sintering temperature of the ceramic matrix. It depends on the nature of the preceramic polymer used.

According to a second aspect, the invention provides a multilayer structure intended for applications in microelectronics, the multilayer structure comprising a thick layer disposed between an active layer and a support substrate consisting of one amongst a first substrate and a second substrate, the active layer originating from thinning of the other one amongst the first substrate and the second substrate, the thick layer comprising, or consisting of a composite material including, or consisting of a ceramic matrix derived from a polymer and inorganic particles, the nature and the charge rate of inorganic particles of the composite material being selected so that the thick layer has a CTE which differs at most by 15% from the CTE of the material of the support substrate and that of the active layer, in particular which differs at most by 10% of the CTE of the material of the support substrate and that of the active layer and for example which differs at most by 5% of the CTE of the material of the support substrate and that of the active layer.

Thus configured, the multilayer structure has a very good mechanical strength between the room temperature and the temperature of use, for example 800-1,000° C.

In the present document, it should be understood that the ceramic of the ceramic matrix is a ceramic derived from a polymer originating from the pyrolysis of a preceramic polymer charged with inorganic particles. Said ceramic matrix is devoid of any sintering. It is mostly amorphous, and possibly completely amorphous, which differs from sintered ceramic which is mostly polycrystalline.

Advantageously, the first and second substrates are made of the same material.

According to one arrangement, the first substrate and/or the second substrate are made of a monocrystalline silicon.

According to one possibility, the material of the active layer is selected from among a monocrystalline material in order to optimize the performances of the components.

According to another possibility, the multilayer structure comprises an active layer and a support substrate made of silicon, and wherein the thick layer is a ceramic matrix of SiOxCy, with x less than 2 and y different from zero, and the inorganic particles consist of SiC.

According to other features, the method for producing the multilayer structure of the invention and the multilayer structure itself, includes one or more of the following optional features considered alone or in combination:

The thick layer has a thickness comprised between 10 and 500 micrometers. Beyond that, the risk of cracks appearing increases during ceramization (in other words, during pyrolysis).

The ceramized thick layer, namely the thick layer comprising the ceramic matrix composite material and inorganic particles, has a thickness comprised between about 5 and 400 micrometers.

The thick layer is bonded to the support substrate or to the active layer via an adhesion primer layer.

The adhesion primer layer is formed from a polysiloxane preceramic polymer, such as SILRES® H62C or SILRES® MK POWDER.

The adhesion primer layer is formed from a composition comprising a polysiloxane preceramic polymer of SILRES® H62C in a proportion ranging from 70% to 80% by weight, diluted in a Diestone DLS solvent in a proportion ranging from 20% at 30% by weight.

The adhesion primer layer has a thickness comprised between 1 and 10 micrometers.

The active layer has a variable thickness between 1.4 micrometers and 100 micrometers.

The active layer obtained by fracture thinning advantageously has a thickness comprised between 1.4 and 1.6 micrometers.

The active layer has a thickness comprised between 10 and 100 micrometers when it originates from thinning of the first or second substrate by rectification.

The materials of the first substrate and of the second substrate are selected from semiconductor materials, in particular Si, Ge, GaN, and/or SiC.

The materials of the first substrate and of the second substrate consist of two materials of different nature.

The materials of the first substrate and of the second substrate consist of two materials of identical nature.

The materials of the first substrate and/or of the second substrate are monocrystalline.

Said multi-layer structure thus formed is capable of receiving treatments intended for the manufacture of electronic components, such as rectification, thinning, chemical-mechanical polishing, etching, deposition of a dielectric or a metal, deposition of at least one layer, including an active layer intended to receive at least one electronic component, patterning, passivation, heat treatment, or a combination of at least one of these treatments.

Other aspects, aims and advantages of the present invention will appear better upon reading the following description of two embodiments thereof, given as non-limiting examples and made with reference to the appended drawings. The figures do not necessarily comply with the scale of all of the represented elements so as to improve readability thereof. Dotted lines are used in the figures so as to distinctly and clearly illustrate a weakening plane in a material layer which is in a continuous form. In the following description, for simplicity, identical, similar or equivalent elements of the different embodiments bear the same reference numerals.

FIG. 1 is a schematic view illustrating a step a1) of implantation in a first substrate according to the first embodiment of the invention, FIG. 2 is a schematic view illustrating a step a2) of depositing a stiffening layer according to the first embodiment of the invention, FIG. 3 is a schematic view illustrating step b) of depositing a thick layer according to the first embodiment of the invention, FIG. 4 is a schematic view illustrating step c) of providing a second substrate covered with an adhesion primer layer according to the first embodiment of the invention, FIG. 5 is a schematic view illustrating step i) of hot-pressing a thick layer in contact with the second substrate according to the first embodiment of the invention, FIG. 6 is a schematic view illustrating step e) of thinning along a weakening plane according to the first embodiment of the invention, FIG. 7 is a schematic view illustrating a multilayer structure obtained according to the first embodiment of the invention, FIG. 8 is a schematic view illustrating step b) of depositing a thick layer according to a second embodiment of the invention, FIG. 9 is a schematic view illustrating a hot-pressing step i) according to the embodiment of FIG. 8, FIG. 10 is a schematic view illustrating the thinning step e) according to the embodiment of FIG. 8.

A first embodiment of the method of the invention is illustrated in FIGS. 1 to 7, wherein a multilayer structure 100 is obtained by Smart Cut™ technology. To do so, and as illustrated in FIG. 1, a first substrate 1 made of silicon is provided (step a) then implanted with hydrogen ions with an energy of 160 keV so as to obtain a weakening plan 2 that is quite deep in the substrate 1 (step a1). Afterwards, a step a2) of depositing a stiffening layer 3 made of $Si_3N_4$ is carried out over the implanted face of the first substrate 1 (FIG. 2). The deposition is carried out by a low temperature technique, such as PECVD at 300° C. with a thickness of about 4 micrometers. Thus constituted, the CTE of the stiffening layer 3 is about $3.3 \times 10^{-6}/°$ C., which is compatible with that of silicon.

According to FIG. 3, a thick layer 4 is obtained by coating a precursor formulation comprising polysiloxane preceramic polymer at 30% by volume and inorganic SiC particles (CTE of $4\text{-}4.5 \times 10^{-6}/°$ C.—source Matweb.com website) at 70% by volume for 100% of the total volume of the dry precursor formulation. According to other variants that are not illustrated, the volume charge rate of the inorganic particles is comprised between 50 and 70% by volume depending on the nature of the particles and the materials of the substrates considered.

More particularly, the precursor formulation is prepared by mixing a SILRES® MK POWDER polysiloxane preceramic polymer supplied in a powder form by the Wacker company in a proportion of about 2.4% by weight with a Diestone DLS solvent in a proportion of about 27.9% by weight, and inorganic SiC particles in a proportion of 69.7% by weight. This precursor formulation composition has a CTE which differs by less than 10% from that of silicon, comprise between 3 and $4 \times 10^{-6}/°$ C. between 200° C. and 1,000° C. according to J. Haisman (applied Optics 1999). According to another variant, the inorganic SiC particles are replaced by a mixture of $Si_3N_4$ (CTE of $3.3 \times 10^{-6}/°$ C.) in a proportion of 75-85% by volume with $Al_2O_3$ (CTE of $8.2 \times 10^{-6}/°$ C.) in a proportion of 15-25% by volume. According to still another variant, the inorganic SiC particles are replaced by a mixture of $Si_3N_4$ in a proportion of 45-70% by volume with AlN (CTE of $5.5 \times 10^{-6}/°$ ° C. between 25 and 1,000° C. according to the matweb website) in a proportion of 30-55% by volume.

Afterwards, the solvent of the thick layer 4 is evaporated at room temperature then the thick layer 4 is rectified so as to thin it to the desired thickness and flatten the surface. The typical thickness of the thick layer 4 is comprised between 10 and 500 micrometers after evaporation of the solvent, depending on the desired applications.

According to a variant that is not illustrated, the solvent is evaporated in an oven set between 30 and 100° C.

According to another variant that is not illustrated, the deposition of the thick layer 4 is carried out by hot pressing when the precursor formulation based on SILRES® MK POWDER and SiC does not contain any solvent.

As illustrated in FIG. 4, a second silicon substrate 5 is provided according to step c) of the method. An adhesion primer layer 6 is deposited at the surface to reach a thickness of 10 micrometers so as to facilitate bonding with the thick layer 4. This adhesion primer layer is selected from among an adhesion preceramic polymer so as to withstand the high heat treatment and to facilitate adhesion and bonding with the thick layer 4, itself made of a preceramic polymer. This herein consists of a polysiloxane, SILRES® H62C available in liquid form from the supplier Wacker (75% by weight of the total precursor formulation), it is diluted with a Diestone DLS solvent (25% by weight of the total formulation precursor). According to other possibilities that are not shown, the precursor formulation of the adhesion primer layer 6 is enriched with metallic, ceramic or polymer particles, depending on the targeted properties and/or to limit volume shrinkage during pyrolysis.

A pre-crosslinking step is applied to this adhesion primer layer 6 by applying a heat treatment at a temperature of 175° C. for 1 hour. This step allows pre-hardening the preceramic bonding polymer at a temperature lower than the crosslinking temperature, so as to confer adhesive properties enabling bonding with the thick layer 4, without diffusing into the latter. According to another arrangement that is not illustrated, the adhesion primer layer 6 is deposited over the thick layer 4 pre-crosslinked beforehand, for bonding with the second support substrate 5.

According to still another variant that is not illustrated, the adhesion primer layer 6 is deposited over the stiffening layer 3 before deposition of the thick layer 4, which allows for a good adhesion between the stiffening layer 3 and the thick layer 4 but also completing the stiffening effect of the stiffening layer 3 by filling the porosity of the thick layer 4.

According to another possibility that is not illustrated, the method does not include a step of forming an adhesion primer layer 6, the nature of the selected materials and the conditions allow obtaining enough bonding energy for the desired subsequent operations even in the absence of this layer.

According to step d) of the method illustrated in FIG. 5, the thick layer 4 is brought into contact with the second substrate 5 via the adhesion primer layer 6 and forms a stack 10. Then, a hot-pressing step i) is applied to the stack 10, over a period of 4 hours. The applied pressure is 470 kPa and the heat treatment is carried out at a temperature of 200° C. enabling crosslinking and initial compaction of the SIL-RES® MK POWDER and also that of SILRES® H62C. The crosslinking temperature is applied by a heating ramp conventionally ranging between 0.1 to 20° C./min. It is 1° C./min in this specific example.

As illustrated in FIG. 6, a thinning step e) is carried out afterwards by applying a fracture thermal budget so as to obtain separation along the weakening plane 2. It is applied in the form of a heating ramp of 5° C./min with a stage at 300° C. and 500° ° C. for 1 hour in this specific example. Thus, an active layer 7 of silicon with a thickness of 1.5 micrometers is obtained.

Finally, as illustrated in FIG. 7, the process comprises a step f) of pyrolysis heat treatment under argon until reaching the ceramization temperature of SILRES® MK POWDER with a heating ramp of 1° C./min up to 1,000° C. comprising two stages of 1 hour each at 600° C. and 800° C., and during which the temperature drops freely. The heat treatment at 1,000° C. also allows fixing implantation defects in silicon. The thick layer 4 is also compacted, its initial thickness is approximately halved. Thus, a multilayer structure 100 is obtained, it comprises, from the surface towards the base, an active layer 7 made of silicon, a stiffening layer 3 of $Si_3N_4$, a thick layer 4 of an amorphous ceramic matrix composite material, non-sintered and filled with SiC particles, an adhesion primer layer 6 and a second silicon substrate 5.

A second embodiment of the invention is now described with reference to FIGS. 8 to 10. This embodiment differs from the previous one in particular in that the thinning step e) is obtained through an operation of rectifying the first substrate 1 or the second substrate 5. As illustrated in FIG. 8, a thick layer 4 of a precursor formulation is deposited by screen-printing over a first substrate 1 of monocrystalline silicon. The precursor formulation consists of a mixture of SILRES MK POWDER (50% by volume) and inorganic particles (50% by volume) of $Si_3N_4$ and $Al_2O_3$ in a proportion respectively of 80/20, in which the solvent Diestone DLS is added so as to reach the desired viscosity for deposition by screen-printing. After drying the solvent at room temperature, a second substrate 5 of polycrystalline silicon covered with an adhesion primer layer 6 made of pre-crosslinked preceramic polymer is provided for contact and bonding with the thick layer 4. A hot-pressing step i) is carried out at a crosslinking temperature of the preceramic polymer so as to stabilize the obtained stack 10 (FIG. 9). Then, a rectification step e) is carried out on the first substrate 1 so as to obtain an active layer 7 made of monocrystalline silicon having a thickness of about 20 micrometers. Note that, in this case where thinning is carried out by rectification, the presence of a stiffening layer 3 is not necessary. A pyrolysis treatment at 1,000° C. is performed (step f) with a heating ramp of 1° C./min comprising two stages at 600° C. and 800° C. Each of the two stages lasts 1 hour during which the temperature is allowed to drop freely. Thus, a multilayer structure 100 is obtained comprising from its base towards its surface:

a support substrate consisting of the second substrate 5 covered with an adhesion primer layer 6, a thick layer 4 of a SiOC amorphous ceramic matrix composite material, devoid of sintering, comprising inorganic fillers of $Si_3N_4$ and $Al_2O_3$ and having a thickness of 100 micrometers, and an active layer 7 made of monocrystalline Si with a thickness of 20 micrometers. Advantageously, the thick layer 4 has a CTE which differs at most by 15% from the CTE of the material of the support substrate (FIG. 10).

Thus, the present invention proposes a method for producing a multilayer structure that is simple to implement. Thanks to the choice of the nature and thickness of the layers, the structure is resistant to high temperatures and capable of significant heat dissipation. Other properties could be obtained through a judicious selection of the used preceramic polymer, as well as of the rate and nature of the inorganic fillers, while preserving the desired characteristics regarding the CTE of the different layers.

The invention claimed is:

1. A method for producing a multilayer structure intended for applications in the field of microelectronics, the method comprising the following steps:

a) providing a first substrate, b) depositing a thick layer of a precursor formulation comprising a preceramic polymer charged with inorganic particles over the first substrate, c) providing a second substrate, d) bonding the thick layer and the second substrate, e) thinning the first substrate or the second substrate so as to obtain an active layer, f) applying a pyrolysis heat treatment so as to ceramize the preceramic polymer of the thick layer and obtain a ceramic matrix composite material, the charge rate and the nature of the inorganic particles being selected so that the thick layer has a coefficient of thermal expansion which differs, at most, by 15% from that of the first substrate and that of the second substrate, between room temperature and the pyrolysis temperature.

2. The method for producing a multilayer structure according to claim 1, wherein the bonding of step d) between the thick layer and the second substrate is carried out via an adhesion primer layer, formed beforehand over the second substrate and/or over the thick layer.

3. The method for producing a multilayer structure according to claim 1, wherein the bonding of step d) comprises a step of bringing the thick layer and the second substrate into contact so as to form a stack and a step i) of hot pressing the stack.

4. The method for producing a multilayer structure according to claim 1, wherein the precursor formulation comprises a charge rate of inorganic particles in a range from 50% to 80% by volume with respect to the volume of the preceramic polymer.

5. The method for producing a multilayer structure according to claim 1, wherein the inorganic particles are selected from $Si_3N_4$, SiC, AlN, $Al_2O_3$ and a mixture of these inorganic particles.

6. The method for producing a multilayer structure according to claim 1, wherein the preceramic polymer of the precursor formulation is selected from the group consisting of polysiloxanes, polycarbosilanes, polycarbosiloxanes polysilazanes, polysilsesquioxanes, polysilylcarbodiimides, polysilsesquicarbodiimides, polysilsesquiazane, polyborosilanes, polyborosiloxanes, polyborosilazanes, and a combination of these polymers.

7. The method for producing a multilayer structure according to claim 1, wherein step b) of depositing the thick layer is carried out by coating or screen-printing.

8. The production method according to claim 1, comprising before step b) a step a1) of implanting ionic species in the first substrate so as to create a weakening plane, and wherein the thinning step e) comprises a fracture along the weakening plane.

9. The production method according to claim 8, comprising after the implantation step a1), a step a2) of depositing a stiffening layer over the implanted first substrate.

10. The method for producing a multilayer structure according to claim 1, wherein the thinning step e) is carried out by rectification, so as to obtain a thickness of active layer ranging from 10 micrometers to 140 micrometers.

11. A multilayer structure intended for applications in microelectronics, the multilayer structure comprising a thick layer disposed between an active layer and a support substrate consisting of one amongst a first substrate and a second substrate, the active layer originating from thinning of the other one amongst the first substrate and the second substrate, the thick layer comprising a composite material including a ceramic matrix and inorganic particles, the nature and the charge rate of inorganic particles being selected so that the thick layer has a CTE which differs at most by 15% from the CTE of the material of the support substrate and that of the active layer.

12. An intermediate structure intended to form by pyrolysis the multilayer structure according to claim 11, the intermediate structure comprising a thick layer disposed between an active layer and a support substrate consisting of one amongst a first substrate and a second substrate, the active layer originating from thinning of the other one amongst the first substrate and the second substrate, the thick layer comprising a preceramic polymer charged with inorganic particles, the nature and the charge rate of inorganic particles being selected so that the thick layer has a CTE which differs at most by 15% from the CTE of the material of the support substrate and that of the active layer between room temperature and a pyrolysis temperature of the preceramic polymer.

* * * * *